Jan. 19, 1965  E. ROCKER  3,166,355
CHILD'S CAR SEAT
Filed July 11, 1963  2 Sheets-Sheet 1

INVENTOR.
ELMER ROCKER
BY
ATTORNEYS

Jan. 19, 1965  E. ROCKER  3,166,355
CHILD'S CAR SEAT
Filed July 11, 1963  2 Sheets-Sheet 2

INVENTOR.
ELMER ROCKER
BY
ATTORNEYS

United States Patent Office 3,166,355
Patented Jan. 19, 1965

3,166,355
CHILD'S CAR SEAT
Elmer Rocker, Shaker Heights, Ohio, assignor to Century Products, Inc., Cleveland, Ohio, a corporation of Ohio
Filed July 11, 1963, Ser. No. 294,419
7 Claims. (Cl. 297—256)

This invention relates generally to car seats, but has reference more particularly to a seat especially designed for use by a child or infant.

A primary object of the invention is to provide a car seat of the character described which consists virtually entirely of a one-piece plastic seat and associated metal parts.

Another object of the invention is to provide a car seat of the character described in which the plastic seat has a novel plastic hinge construction formed integrally with the plastic seat, and through the use of which, adjustment of the seat may be made in a simple manner for sitting, standing, or storing.

A further object of the invention is to provide a car seat of the character described, embodying a metal bracket of novel construction, and so designed as to transmit the child's weight from the aforesaid plastic seat to the brackets through metal handle bars and support rods.

A further object of the invention is to provide a car seat of the character described which may be easily cleaned and retained in a neat, attractive and sanitary condition at all times.

A further object of the invention is to provide a car seat of the character described, which consists of a minimum number of parts of relatively simple and inexpensive construction, enabling the seat to be manufactured and assembled at low cost.

A still further object of the invention is to provide a car seat of the character described which consists of parts which are so constructed and assembled as to enable the seat to be folded or collapsed into a relatively small and flat package for storage purposes in a small space, and for shipment or transportation in a relatively small carton or container.

Other objects and advantages of my invention will be apparent during the course of the following description.

In the accompanying drawings forming a part of this specification, and in which like numerals are employed to designate like parts throughout the same, FIG. 1 is a side elevational view of a car seat embodying the invention, the seat being shown in open or operative position or condition;

Figures 1, 3, 4, 5:
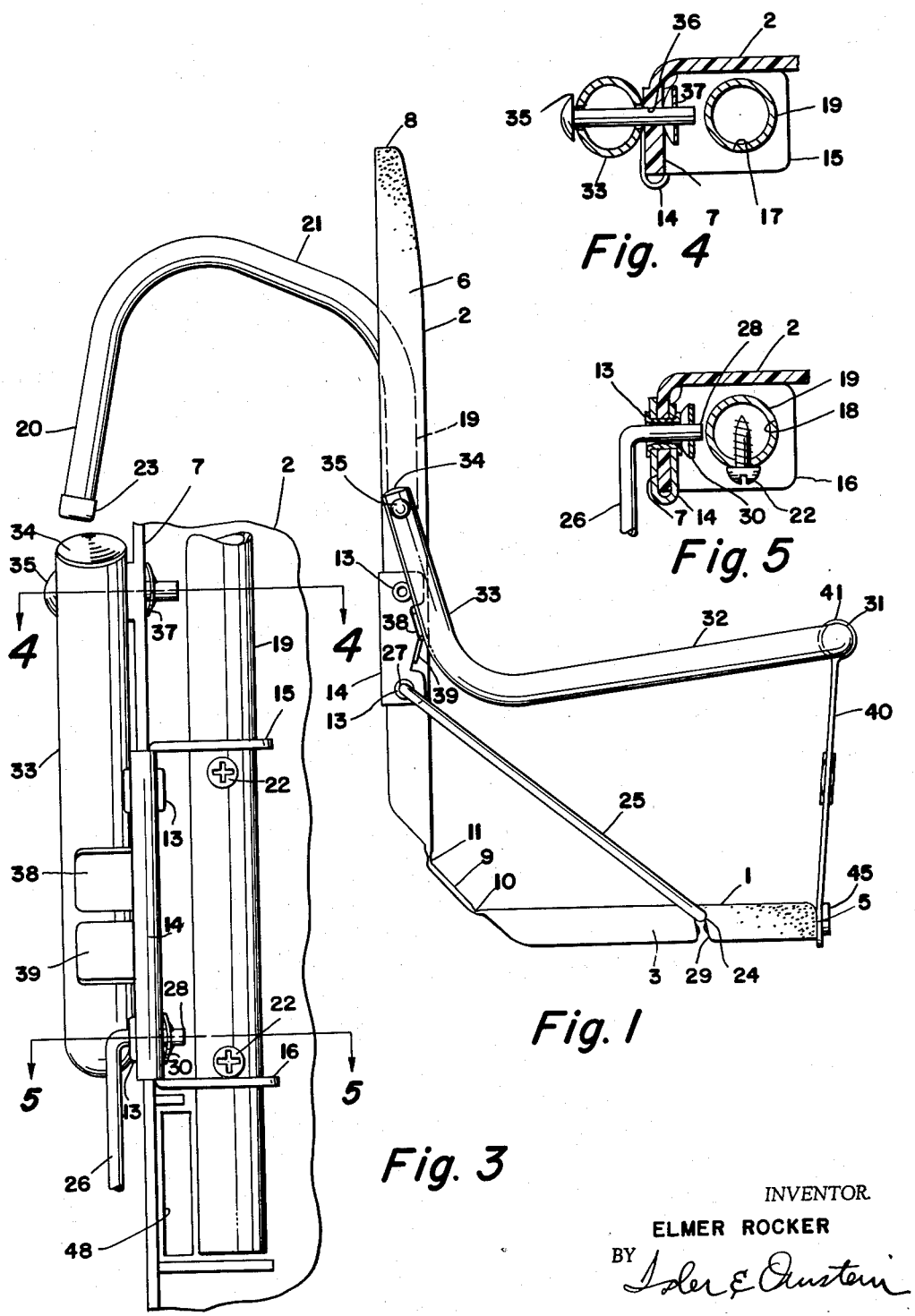
FIG. 3 is a fragmentary rear elevational view of a portion of the car seat.
FIG. 4 is a fragmentary cross-sectional view, taken on the line 4—4 of FIG. 3.
FIG. 5 is a fragmentary cross-sectional view, taken on the line 5—5 of FIG. 3.

Referring more particularly to the drawings, the child's car seat will be seen to comprise a seat proper, preferably formed of polyethylene or like plastic, and consisting of a seat portion 1 and back portion 2, the seat portion provided at its sides with downturned flanges 3 and 4, and at its front with a downturned flange 5, these flanges being continuous with each other. The back portion 2 is provided at its sides with rearwardly extending flanges 6 and 7, and at its top with a rearwardly extending flange 8, these flanges being also continuous with each other.

The seat is also provided with a joint area 9 between the seat portion 1 and the back portion 2, this joint area being joined to the seat portion 1 by a hinge 10, which is formed integrally with the seat, as by compressing the plastic at this point. The joint area 9 is similarly joined to the back portion 2 by a hinge 11, which is formed integrally with the seat, as by compressing the plastic at this point.

It will be noted that flanges are not provided at the ends of the joint area 9, nor at portions of the seat adjacent this area, so that the seat portion 1 is freely movable up or down with respect to the back portion 2, about the hinges which have been described.

The flanges 6 and 7 have riveted thereto, adjacent their lower ends, as by hollow rivets or eyelets 13, metallic brackets 14, of U-shaped cross-section. These brackets 14 are provided at their ends with flanges 15 and 16 which extend inwardly along the rear surface of the back portion 2 of the seat, and are provided with openings 17 and 18 respectively.

For the purpose of suspending the seat from the upper edge of an automobile seat (not shown), spaced tubular hanger bars are provided, each of which consists of a vertical front leg 19, a rear leg 20, and a portion 21 interconnecting the front and rear legs.

The front legs 19 of these hanger bars extend through the openings 17 and 18 of the flanges 15 and 16, and are locked against vertical movement relatively to these flanges, as by means of sheet metal screws 22 which extend into the legs 19 adjacent the flanges, whereby the heads of these screws abut the flanges to prevent such movement.

The flanges 15 and 16 also serve as bearings for the legs 19, permitting the hanger bars of which the legs are a part, to be swung to operative position as shown in FIG. 1, or against the rear surface of the back portion 2 of the seat, as when the seat is to be stored.

The lower ends of the rear legs 20 are provided with plastic caps 23.

Figure 2:
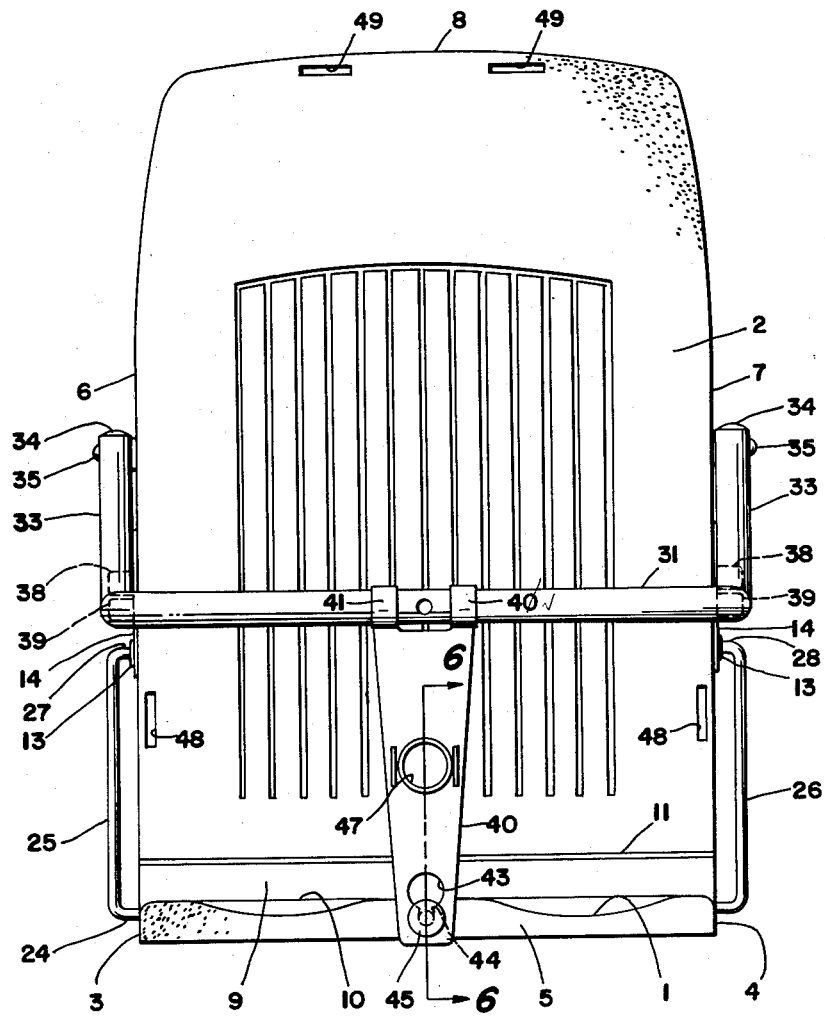
FIG. 2 is a front elevational view of the car seat in open or operative position or condition.
Figure 6:
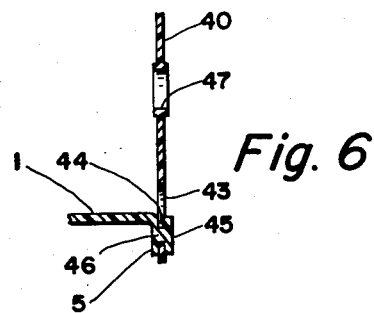
FIG. 6 is a fragmentary cross-sectional view, taken on the line 6—6 of FIG. 2.

For the purpose of supporting the seat portion 1 of the seat in its horizontal or operative position, as shown in FIGS. 1 and 2, a support rod is provided, formed of a single piece of metallic rod or wire stock, and consisting of a transversely extending intermediate portion 24, spaced arms 25 and 26, and terminal portions or ends 27 and 28 which extend inwardly from the rear ends of the arms 25 and 26, and are parallel to the intermediate portion 24.

The terminal portions or ends 27 and 28 of the support rod extend through the lower rivets or eyelets 13, whereby these rivets or eyelets provide bearings for the seat support, permitting the seat support to swing to any desired position about the axes of these rivets.

In the position shown in FIG. 1, the intermediate portion 24 of the support rod is received in inclined recesses 29 in the flanges 3 and 4 of the seat portion 1 of the seat, so that the support rod is effective to properly support the seat portion of the seat.

The terminal portions or ends 27 and 28 of the support rod are retained against displacement from the rivets or eyelets 13 by means of speed nuts, speed washers or speed clips 30, which are slipped over these terminal portions.

The car seat is also provided with a handle bar, made of tubular metal stock, and consisting of an intermediate transversely extending portion 31, and spaced rearwardly and downwardly extending arms 32, each of which is provided with an upturned terminal portion 33, the upper end of which is closed, as by a plug button 34.

The terminal portions 33 of the arms 32 extend along the outboard surfaces of the flanges 6 and 7 and are secured to these flanges by means of solid rivets 35, which extend through openings 36 in these flanges, and are retained against displacement from the flanges by means of clips 37 similar to the clips 30.

The rivets 35 also serve as pivots, permitting the handle bar to be swung about the rivets to the operative position shown in FIGS. 1 and 2, or to an inoperative position substantially in the plane of the back portion 2 of the seat, whereby storage of the seat or packing of the seat in a small shipping carton is facilitated.

The handle bar is supported in the operative position shown in FIGS. 1 and 2 by engagement of the terminal portions 33 of the arms 32 with abutments 38, which are provided by forming flanges on the brackets 14, which extend in an outboard direction from the flanges 6 and 7. It may be noted, at this point, that the brackets 14 are also provided with abutment flanges 39, similar to the flanges 38, but inclined downwardly and rearwardly, instead of upwardly and rearwardly, as are the flanges 38. The purpose of this is to enable the same bracket to be used at one side of the seat or the other. In using the bracket shown in FIG. 1 at the side of the seat remote from that seen, the bracket is merely inverted, in which case, the flange 39 serves as the abutment for the terminal portion 33 at the other side of the handle bar.

For the purpose of providing additional support for the seat portion 1 of the seat in the position shown in FIG. 1, as well as to prevent the child occupant of the seat from sliding forwardly through the space below the portion 31 of the handle bar, there is provided a seat strap 40 of a flexible plastic, such as polyethylene. The strap 40 is provided with spaced tubular portions 41 and 42 at its upper end, through which the portion 31 of the handle bar extends, and is provided adjacent its lower end with a bayonet slot consisting of an enlarged circular opening 43 and a narrow recess 44 extending radially downwardly from the opening 43.

The flange 5 of the seat portion 1 of the seat is provided intermediate its ends with a circular button 45 spaced forwardly from the flange and connected integrally with the flange by means of a neck 46 of substantially the same diameter as the width of the recess 44. The button 45 is of substantially the same diameter as that of the opening 43.

The strap 40 may thus be connected to the seat portion 1 of the seat by passing the button 45 through the opening 43, then moving the flange 5 downwardly to cause the neck 46 to enter the recess 44, thereby locking the strap 40 to the flange 5.

To facilitate disconnecting the strap 40 from the flange 5, the strap is provided with a large opening 47, which serves as a finger hold, so that when it is desired to disconnect the strap from the flange 5, an adult can insert one of his fingers, such as the index finger, into this opening, and use his thumb to lift the neck 46 out of the recess 44, thus permitting the other hand to be used to pull the strap over the button 45. This operation is further facilitated by the fact that the strap 40 is pivotally movable about the portion 31 of the handle bar.

The back portion 2 of the seat is provided with spaced vertical slots 48 for passage therethrough of a horizontal harness strap (not shown) by which the child is harnessed to the seat, and with spaced horizontal slots 49 for passage therethrough of spaced vertical harness straps (not shown), by which the back of the child is harnessed to the back portion of the seat. The ends of the vertical harness straps are anchored to the horizontal harness strap.

In folding the seat, it is only necessary to disconnect the strap 40 from the seat portion 1, lift the handle bar to a position substantially coplanar with the back portion 2 of the seat, disconnect the support rod from the seat portion 1 and swing it downwardly and against the rear of the back portion 2 of the seat, swing the hanger bars inwardly against the rear of the back portion 2 of the seat, and fold the seat portion 2 of the seat about the hinges and substantially into parallelism with the front face of the back portion 2 of the seat.

In the operative position of the seat, as shown in FIG. 1, the seat portion 1 of the seat may be dropped to a substantially vertical position, by disconnecting the strap 40 from the seat portion of the seat and disconnecting the support rod from the seat portion of the seat, thereby enabling the child to stand on the automobile seat, while still confined to the child's seat. This is desired, at times, and the seat construction is such as to permit this to be done with a minimum of effort.

It is thus seen that I have provided a car seat which consists virtually entirely of a one-piece plastic seat and associated metal parts and that the plastic seat has a novel hinge construction formed integrally, and through the use of which adjustment may be made in a simple manner for sitting, standing or storing.

It is also seen that the brackets which have been described are of such construction and so designed as to enable the child's weight to be transmitted thereto from the plastic seat through the metal handle bars and support rods.

The seat, due to its novel construction and design may be easily cleaned and retained in a neat, attractive and sanitary condition at all times.

The seat consists of a minimum number of parts of relatively simple and inexpensive construction, enabling it to be manufactured and assembled at low cost, and to be folded or collapsed into a relatively small and flat package for storage purposes in a small space and for shipment or transportation in a relatively small carton or container.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a child's car seat of the character described, a seat proper comprising a seat portion and a back portion, said back portion having rearwardly-extending flanges at its sides, brackets of U-shaped cross-section secured to and embracing said flanges, said brackets having inclined abutment flanges, a handle bar, and means pivotally connecting said handle bar to said first-named flanges, said handle bar maintained in operative position by abutment of portions thereof with said abutment flanges.

2. A child's car seat, as defined in claim 1, in which said means for pivotally connecting said handle bar to said first-named flanges consists of headed pins extending through said handle bar and through said first-named flanges, and speed clips retaining said pins against displacement.

3. A child's car seat, as defined in claim 2, including a plastic strap interconnecting said handle bar with said seat portion, said strap being pivotally movable about portions of said handle bar.

4. In a child's car seat of the character described, having a seat portion and a back portion, said back portion having rearwardly extending flanges at its sides, brackets of U-shaped cross-section, hollow rivets securing said brackets to said flanges, said seat portion having downwardly extending side flanges having rearwardly inclined recesses, a support rod formed of a single piece of rod stock having a transversely extending intermediate portion receivable in said recesses, arm portions extending rearwardly and upwardly from said transversely extending portion, and inturned terminal portions extending through said hollow rivets and being pivotally movable in said rivets.

5. A child's car seat, as defined in claim 4, including speed clips secured to said terminal portions and preventing displacement thereof from said brackets.

6. In a child's car seat of the character described, a seat proper comprising a seat portion and a back portion, said back portion having rearwardly extending flanges at its sides, brackets of U-shaped cross-section secured to said flanges and embracing said flanges, said brackets having vertically-spaced flanges extending from the inboard arms thereof, and inclined abutment flanges extending from the outboard arms thereof, means for suspending said seat from the upper edge of an automobile seat, said means comprising hanger bars having front leg portions extending through said first-named flanges of said brackets and rotatable in said first-named flanges of said brackets, a handle bar, and means pivotally connecting said handle bar to said rearwardly extending flanges of said back portion, said handle bar supported in operative position by abutment of portions thereof with said abutment flanges of said brackets.

7. A child's car seat, as defined in claim 6, in which said brackets are secured to said rearwardly extending flanges by means of hollow rivets, and a support rod is provided for supporting said seat portion of said seat in a horizontal position, said rod having terminal portions extending through said hollow rivets and being pivotally movable in said rivets.

References Cited by the Examiner

UNITED STATES PATENTS

| | | | |
|---|---|---|---|
| 540,034 | 5/95 | Swan | 297—256 |
| 2,349,092 | 5/44 | Hammer | 297—256 |
| 2,399,792 | 5/46 | Copp | 297—255 |
| 2,561,036 | 7/51 | Sodders | 297—440 |
| 2,690,787 | 10/54 | Soltis | 297—255 |
| 2,792,054 | 5/57 | Muoio | 297—256 |
| 2,928,553 | 3/60 | Freedman | 108—60 |
| 2,990,007 | 6/61 | Kessler | 297—335 |
| 2,994,557 | 8/61 | King | 297—256 |
| 3,012,818 | 12/61 | Brown | 297—457 |
| 3,025,105 | 3/62 | Nash | 297—457 |
| 3,052,500 | 9/62 | Hyde | 297—254 |
| 3,061,374 | 10/62 | Grosfillex | 297—457 |

FOREIGN PATENTS

| | | |
|---|---|---|
| 382,837 | 11/32 | Great Britain. |
| 577,926 | 6/46 | Great Britain. |

FRANK B. SHERRY, *Primary Examiner.*